United States Patent
Lee et al.

(10) Patent No.: US 9,500,102 B2
(45) Date of Patent: Nov. 22, 2016

(54) STEAM TRAP SYSTEM

(71) Applicant: Metalgentech Co., Ltd., Seoul (KR)

(72) Inventors: Jung Eui Lee, Anyang-si (KR); Young Nam Ahn, Incheon (KR); Byoung Kwon Choi, Hwaseong-si (KR); Byung Hyuk Jeon, Seoul (KR); Min Cheol Kim, Seoul (KR)

(73) Assignee: Metalgentech Co., Ltd., Seoul (KR)

( * ) Notice: Subject to any disclaimer, the term of this patent is extended or adjusted under 35 U.S.C. 154(b) by 0 days.

(21) Appl. No.: 14/707,328

(22) Filed: May 8, 2015

(65) Prior Publication Data

US 2015/0323132 A1 Nov. 12, 2015

(30) Foreign Application Priority Data

May 9, 2014 (KR) .................. 10-2014-0055694

(51) Int. Cl.
*F16T 1/38* (2006.01)
*F01K 5/02* (2006.01)

(52) U.S. Cl.
CPC ............. *F01K 5/02* (2013.01); *F16T 1/383* (2013.01); *F16T 1/386* (2013.01); *Y10T 137/304* (2015.04)

(58) Field of Classification Search
CPC .......... F16T 1/00; F16T 1/38; F16T 1/383; F16T 1/386; Y10T 137/304; Y10T 137/3052; Y10T 137/3056; F01K 5/02
USPC ....... 137/171, 177, 183, 187, 188, 544, 549, 137/550; 251/129.15
See application file for complete search history.

(56) References Cited

U.S. PATENT DOCUMENTS

| | | | | |
|---|---|---|---|---|
| 3,339,411 A * | 9/1967 | Riffie | .................. | G01F 23/242 174/151 |
| 3,905,385 A * | 9/1975 | Green | ................. | F16T 1/00 137/187 |
| 4,494,692 A * | 1/1985 | Dobias | ................. | F16K 31/002 137/183 |
| 4,974,626 A * | 12/1990 | Koch | ................. | F16T 1/00 137/187 |
| 5,018,387 A * | 5/1991 | Myneni | ................. | G01F 23/18 73/295 |
| 2007/0001019 A1* | 1/2007 | Sinstedten | ............... | F16T 1/12 236/93 R |
| 2014/0150891 A1* | 6/2014 | Schlensker | ............... | F16T 1/00 137/197 |
| 2014/0224339 A1* | 8/2014 | Feltgen | ................. | F04B 39/16 137/1 |

FOREIGN PATENT DOCUMENTS

KR 20-0252954 Y1 11/2001
KR 10-2012-0096696 A 8/2012

* cited by examiner

*Primary Examiner* — William McCalister
*Assistant Examiner* — Ian Paquette
(74) *Attorney, Agent, or Firm* — Novick, Kim & Lee, PLLC; Sang Ho Lee

(57) ABSTRACT

A steam trap system is provided which can improve efficiency of sensor assembly and air-tightness. The steam trap system includes: a housing that includes a feeding hole for feeding steam, a discharging hole for discharging condensate water, and an opening; at least one sensor that is disposed inside the housing via the opening; an insulation member that is disposed in the opening to maintain air-tightness and to which the sensor is fixed to expose a terminal; and a cover that is disposed in the insulation member to cover the terminal.

12 Claims, 8 Drawing Sheets

STEAM TRAP SYSTEM

BACKGROUND

1. Field

The present invention relates to a steam trap system and, more particularly, to a steam trap system that can improve efficiency of sensor assembly and air-tightness.

2. Description of Related Technology

In general, a steam trap system is equipment that condenses steam in a drum or a pipe to generate condensate water and discharges only the condensate water to the outside to suppress discharging of steam.

In a system that generates steam, when a temperature rises, an amount of steam in a steam line increases, a steam pressure increases, and an amount of condensate water decreases. When a temperature falls, the amount of steam in the steam line decreases, the steam pressure also decreases, and the amount of condensate water increases. When condensate water is accumulated in the steam line, the steam pressure cannot be maintained to a desired extent, thereby causing a great loss in manufacturing processes. Accordingly, a steam trap system can discharge the condensate water generated in the steam line or the like and maintain the steam pressure required for the manufacturing processes.

A steam trap system according to the related art is disclosed in Korean Patent Application Publication No. 10-2012-0096696. In this system, when condensate water is accumulated up to a level set by a user or set by a manufacturer, the condensate water is automatically discharged, and the condensate water can be discharged using an emergency switch, which is additionally disposed on the top of a condensate water container, even when an element sensing a level malfunctions.

Another steam trap system according to the related art is disclosed as a steam trap in Korean Utility Model Registration No. 20-0252954. In this system, leakage of steam can be suppressed, and a solenoid valve in a discharging pipe is opened even at the time of power failure, thereby normally discharging condensate water in the steam trap.

SUMMARY

Air-tightness for preventing leakage of steam is very important in the steam trap systems. However, the steam trap systems according to the related art do not provide a specific assembly structure of a sensor which is installed inside to measure a water level or a temperature and thus have a problem in that assembly efficiency of a sensor and air-tightness are not guaranteed well. Particularly, when plural sensors are used, this problem should be solved better.

An object of the present invention is to provide a steam trap system which can improve efficiency of sensor assembly and air-tightness and which can minimize unnecessary contact of generated and dropped condensate water with a sensor to enhance measurement accuracy of the sensor. This object is illustrative and the scope of the present invention is not limited to the object.

According to an aspect of the present invention, there is provided a steam trap system including: a housing that includes a feeding hole for feeding steam, a discharging hole for discharging condensate water, and an opening; at least one sensor that is installed inside the housing via the opening; an insulation member that is disposed in the opening to maintain air-tightness and to which the sensor is fixed to expose a terminal; and a cover that is installed in the insulation member to cover the terminal.

According to another aspect of the present invention, the housing may include: first and second chambers in which the feeding hole and the discharging hole are disposed, respectively, and that are partitioned by a partition wall; a penetration hole that is disposed at the bottom the partition wall; and a cap that is detachably attached to an outlet in a lower part.

According to another aspect of the present invention, the steam trap system may further include a plurality of condensation guide pins that are disposed at vertical intervals on a surface of the partition wall facing the feeding hole so as to guide condensation of steam.

According to another aspect of the present invention, the condensation guide pins are inclined upward from the partition wall and a passing hole for passing condensate water is disposed at the bottom thereof.

According to another aspect of the present invention, the sensor may include: an electrode that is disposed to extend downward from the insulation member; an insulation pipe that is disposed outside the electrode; and a condensate water guide that is disposed at the bottom of the insulation pipe so as to expand in a radial direction downward.

According to another aspect of the present invention, the insulation member may include an attachment portion that is disposed inside of the opening via a sealing member and an edge of the attachment portion is fixed to the circumference of the opening with a fastening member. A terminal block may be disposed between the cover and the terminal, the cover is fixed onto the insulation member, and a drawing hole through which a cable connected to the terminal is drawn may be disposed in the cover.

According to another aspect of the present invention, the steam trap system may further include a solenoid valve that is installed on the discharging hole side of the housing so as to turn on/off discharging of condensate water, and the solenoid valve may further include: a valve body in which an inflow channel and an outflow channel are disposed in a lateral part and a bottom part of an operation space; a solenoid driving module that is disposed in the valve body and includes a solenoid and an elastic member; a sheet member that is disposed on the bottom surface of the operation space, is made of an elastic material, and includes an outflow hole communicating with the outflow channel; and a plunger that is disposed in the operation space so as to reciprocate to open or close the outflow hole by the solenoid and the elastic member and that is provided with a surface contact portion coming in surface contact with the sheet member.

According to another aspect of the present invention, the steam trap system may further include: a mesh socket that is disposed around the plunger to be separated from the inner side surface of the operation space and includes at least one inflow hole; and a mesh member that is disposed at the outer side surface of the mesh socket.

According to another aspect of the present invention, the solenoid driving module may include a screwing portion that screws the solenoid driving module into the operation space, and the mesh socket may include a support flange that is supported by the screwing portion.

According to another aspect of the present invention, the sheet member may have a plate shape on which the mesh socket is seated and may be made of fluororubber.

According to another aspect of the present invention, the surface contact portion may be in a ring-like protrusion shape and disposed at an end of the plunger.

According to another aspect of the present invention, the surface contact portion may be disposed manifoldly at an end of the plunger to form concentric circles.

According to another aspect of the present invention, a line contact portion coming in line contact with the sheet member may be disposed at an end of the plunger to form concentric circles with the surface contact portion.

According to the aspects of the present invention, it is possible to improve efficiency of sensor assembly and air-tightness and to minimize unnecessary contact of generated and dropped condensate water with a sensor to enhance measurement accuracy of the sensor. The scope of the present invention is not limited to these advantages.

DETAILED DESCRIPTION

Figure 1:
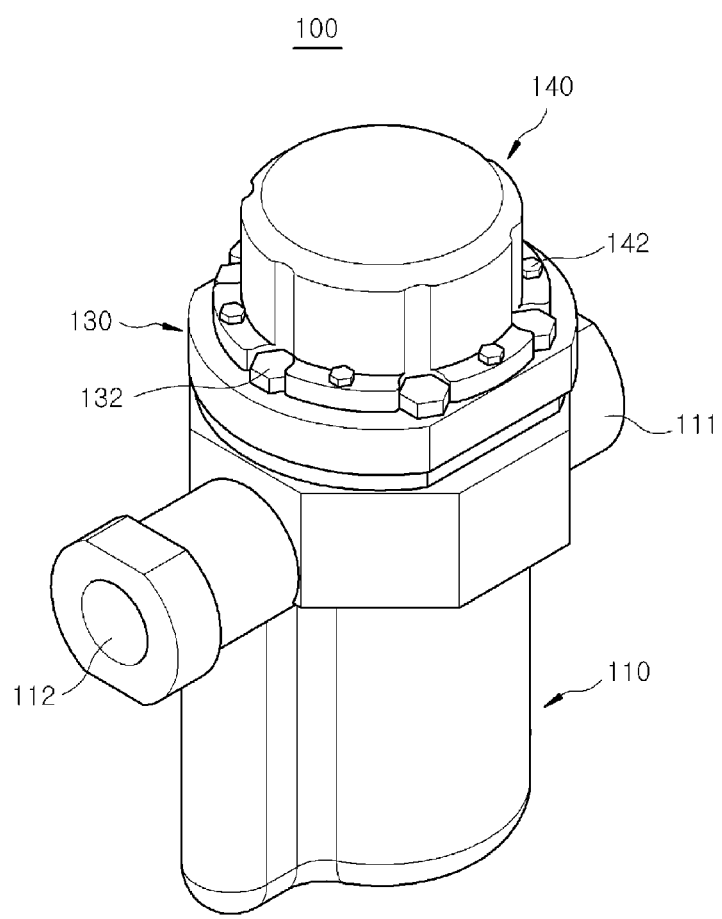
FIG. 1 is a perspective view illustrating a steam trap system according to some embodiments of the present invention.

Hereinafter, various embodiments of the present invention will be described in detail with reference to the accompanying drawings.

Embodiments of the present invention are provided to further completely explain the present invention to those skilled in the art, the following embodiments can be modified in various forms, and the scope of the present invention is not limited to the embodiments. The embodiments are provided to make this disclosure more faithful and complete and to completely transmit the spirit of the present invention to those skilled in the art. Thicknesses or magnitudes of layers in the drawings are exaggerated for the purpose of convenience and clarity of explanation.

In the whole specification, when it is mentioned that one element such as a film, an area, or a substrate is located "on", "to be connected to", "to be stacked on", or "to be coupled to" another element, it can be analyzed that one element is located directly "on", "to be connected to", "to be stacked on", or "to be coupled to" another element or that still another element is interposed therebetween. On the other hand, when it is mentioned that one element such as a film, an area, or a substrate is located "directly on", "to be connected directly to", "to be stacked directly on", or "to be coupled directly to" another element, it can be analyzed that still another element is not interposed therebetween. Like elements will be referenced by like reference numerals. Term "and/or" used in this specification includes any one of arranged items or all combinations of one or more thereof.

In this specification, terms such as "first" and "second" are used to describe various members, components, areas, layers, and/or portions, but the members, components, areas, layers, and/or portions should not be limited to the terms. These terms are used for merely distinguishing one member, component, area, layer, or portion from another member, component, area, layer, or portion. Therefore, a first member, component, area, layer, or portion can denotes a second member, component, area, layer, or portion without departing from the teaching of the present invention.

Relative terms such as "on" or "above" and "under" or "below" can be used herein to describe positional relationships between one element and another element as illustrated in the drawings. The relative terminals can be understood to include other directions of an element in addition to the directions illustrated in the drawings. For example, if an element is turned over in the drawings, an element illustrated to be present on a top surface of another element has a direction on the bottom surface of another element. Accordingly, the term "on" may include all directions of "under" and "on" depending on a specific direction of the drawing. When an element faces another direction (rotates by 90 degrees with respect to another direction), the relative positions or directions used in this specification can be analyzed accordingly.

Terms used in this specification are for explaining specific embodiments and are not for limiting the present invention. In this specification, a singular number may include a plural number unless differently mentioned in the context. Terms "comprise" and/or "comprising" used in this specification specify presence of mentioned shapes, numbers, steps, operations, members, elements, and/or groups thereof, but does not exclude presence or addition of one or more other shapes, numbers, steps, operations, members, elements, and/or groups thereof.

Embodiments of the present invention will be described below with reference to the accompanying drawings schematically illustrating embodiments of the present invention. In the drawings, modifications of the illustrated shapes can be predicted, for example, depending on manufacturing techniques and/or tolerances. Therefore, the embodiments of the present invention should not be analyzed to be limited to a specific shape illustrated in this specification and to include, for example, a variation in shape which is caused in manufacturing.

Figure 2:
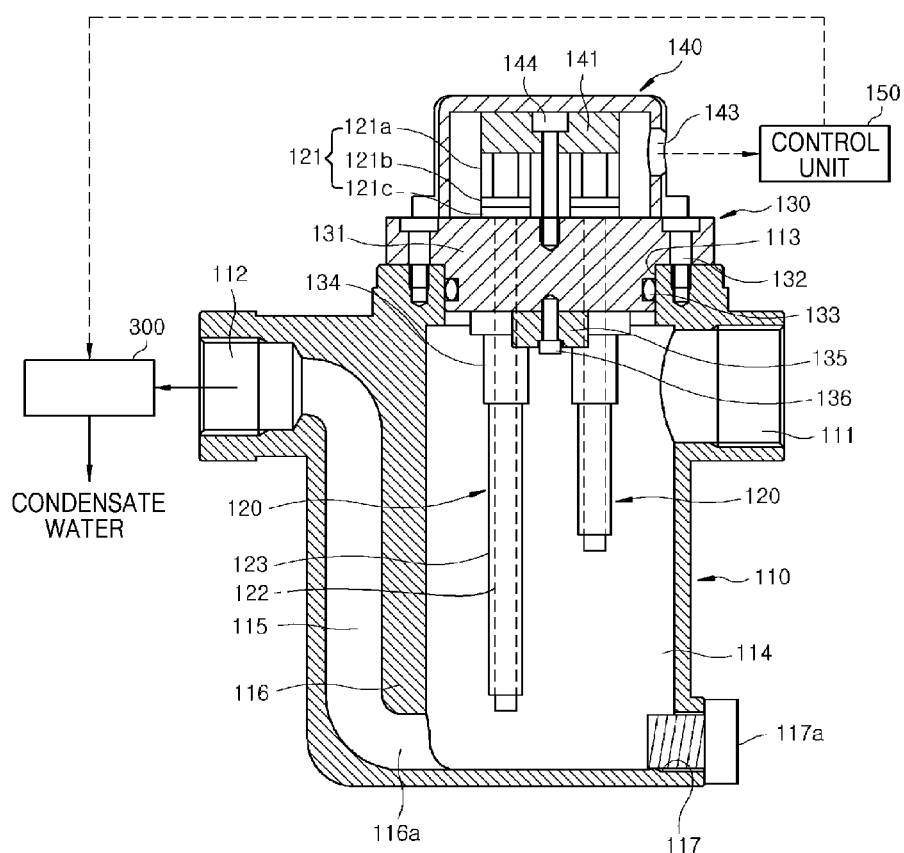
FIG. 2 is a cross-sectional view of FIG. 1.

FIG. 1 is a perspective view illustrating a steam trap system according to some embodiments of the present invention. FIG. 2 is a cross-sectional view of FIG. 1.

As illustrated in FIGS. 1 and 2, a steam trap system 100 according to some embodiments of the present invention includes a housing 110, a sensor 120, an insulation member 130, and a cover 140. The steam trap system 100 according to some embodiments of the present invention suppresses discharging of steam to the outside by discharging condensate water, which is generated by condensing steam fed via a drum or a pipe, to the outside and can be installed in pipes, apparatuses, and other equipment of various industrial plants using steam, such as steelmaking, paper manufacturing, leather, dyeing equipments.

The housing 110 may include a feeding hole 111 for feeding steam, a discharging hole 112 for discharging condensate water, and an opening 113. Here, the feeding hole 111 and the discharging hole 112 may be disposed on both sides of an upper part of the housing 110 to face each other, and a female screw portion or a male screw portion being screwed to a steam feeding pipe for feeding steam and a condensate water discharging pipe for discharging condensate water may be disposed therein. The steam feeding pipe and the condensate water discharging pipe may be connected to the feeding hole 111 and the discharging hole 112 through the use of a fitting member. The opening 113 may be disposed on the top of the housing 110 so as to open the inside thereof, or may be disposed in a lateral part or a bottom part of the housing 110.

In the housing 110, first and second chambers 114 and 115 having the feeding hole 111 and the discharging hole 112 disposed therein, respectively, may be disposed to be partitioned by a partition wall 116, and a penetration hole 116a for passing condensate water from the first chamber 114 to the second chamber 115 may be disposed on the bottom of the partition wall 116. A cap 117a may be detachably coupled to an outlet 117 disposed in the bottom. Here, the first chamber 114 has capacity greater than that of the second chamber 115. The outlet 117 may be disposed on the bottom of the first chamber 114 as in this embodiment, or may be disposed on the bottom of the second chamber 115. The cap 117a may be detachably coupled to the outlet 117, for example, by screwing in consideration of a steam pressure, and may open the outlet 117 to discharge foreign materials such as condensate water, cleaning water, or precipitate in the housing 110.

At least one sensor 120 may be located inside the housing 110 via the opening 113, may be installed to be vertical in the first chamber 114 via the opening 113 on the top of the housing 110. Plural sensors may be arranged to have various shapes. For example, four sensors may be installed to form a rectangular two-dimensional arrangement by the insulation member 130, or some or all of plural sensors may be installed to have different heights of the bottom thereof in the housing 110 so as to make measurement heights or position different. The sensor 120 may be a level sensor for measuring a water level in the housing 110 as in this embodiment or may be a temperature sensor for measuring the temperature in the housing 110.

The sensor 120 may include an electrode 122 which is installed to extend downward from the insulation member 130 and an insulation pipe 123 which is installed outside the electrode 122. Here, a part other than the bottom of the electrode 122 may be insulated by the insulation pipe 123, and the electrode 122 may be supplied with a current and may measure the water level using resistance varying with contact of the bottom with condensate water at the water level. The bottom of the electrode 122 may be provided with a cap allowing condensate water to pass therethrough.

The sensor 120 may include a terminal 121 which is exposed upward from the insulation member 130. The terminal 121 may includes a nut 121a which is screwed to the top of the electrode 122 penetrating the insulation member 130 upward and at least one washers 121b and 121c which is interposed between the insulation member 130 and the nut 121a to connect wires of a cable.

The insulation member 130 may be installed in the opening 113 to maintain air-tightness, the sensor 120 may be fixed thereto to expose the terminal 121, and the insulation member 130 may be made of various insulating materials such as synthetic resin or ceramics. In the insulation member 130, an attachment portion 131 which is attached to the inside of the opening 113 via a sealing member 133, for example, an O ring, and the edge may be fixed to the circumference of the opening 113 by a fastening member 132 such as plural bolts or screws. At this time, an attachment groove (not illustrated) for attachment of the sealing member 133 may be disposed on the outer circumferential surface of the attachment portion 131. Fixing pieces 134 to which the sensors 120 are inserted and fixed may be fixed to the bottom of the insulation member 130 by a fixing block 135 fixed with a fastening member 135.

The cover 140 is disposed in the insulation member 130 to cover the terminal 121 so as to prevent contact with the terminal 121 of the sensor 120. For example, as in this embodiment, a terminal block 141 may be interposed between the terminal 121 and the cover 140, the cover 140 may be fixed onto the insulation member 130 by a fastening member 142 such as bolts or screws, and a drawing hole 143 for drawing a cable connected to the terminal 121 may be disposed on the lateral part thereof. Here, the terminal block 141 may be disposed such that a reception groove for receiving the terminal 121 face the bottom side and may be fixed to the insulation member 130 by a fastening member 144 such as bolts or screws.

Figure 3:
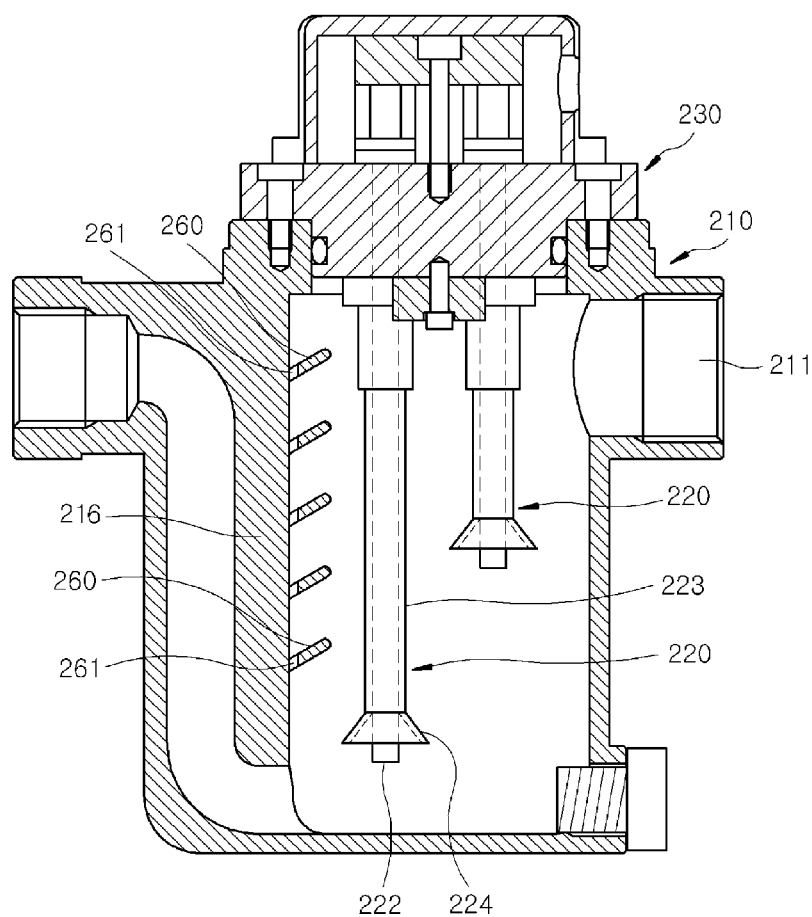
FIG. 3 is a cross-sectional view illustrating a steam trap system according to other embodiments of the present invention.

FIG. 3 is a cross-sectional view illustrating a steam trap system according to other embodiments of the present invention.

As illustrated in FIG. 3, a steam trap system according to other embodiments of the present invention has the same structure as the steam trap system 100 according to some embodiments of the present invention, except that a condensation guide pins 260 are additionally provided and a condensate water guide 224 is disposed in the sensor 220.

The condensation guide pins 260 may be disposed at vertical intervals on the partition wall 216 so as to guide condensation of steam by extending a contact area of the surface facing the feeding hole 211 with steam. The condensation guide pins 260 may be formed integrally with the partition wall 216 or may be manufactured separately from the partition wall 216 and fixed to the partition wall 216 in a coupling manner such as tight fit. The condensation guide pins 260 may be inclined upward from the partition wall 216 so as to extend a contact time with steam when steam fed from the feeding hole 211 collides with the partition wall 216, and a passing hole for passing condensate water may be disposed on the bottom thereof so as not to gather condensate water therein.

The condensate water guide 224 may be disposed on the bottom of the insulation pipe 223 so as to expand in the radial direction downward and may have a cone shape of which the top is truncated as in this embodiment or may have a cup shape of which the bottom is opened in another embodiment or may have various other shapes. Accordingly, moisture or condensate water which is present or generated in the housing 210 is guided by the condensate water guide 224 so as to drop with a distance from the bottom of the electrode 222, and it is thus possible to reduce an error in water level measurement of the sensor 220. Here, the insulation pipe 223 may be installed outside the electrode 222 which is installed to extend downward from the insulation member 230.

As illustrated in FIG. 2, the steam trap system 100 according to some embodiments of the present invention may further include a solenoid valve 300 which is installed on the discharging hole 112 of the housing 110 so as to turn on/off discharging of condensate water. Here, the solenoid valve 300 can be controlled by a control unit 150 receiving a sensing signal of the sensor 120. The sensor 120 is, for example, a level sensor and may include plural level sensors so as to measure several water levels of condensate water, for example, a lowest water level and a highest water level. Accordingly, the solenoid valve 300 may keep the water level of condensate water in the housing 110 in a predetermined range by turning on/off a flow of condensate water discharged via the discharging hole 112 under the control of the control unit 150 receiving sensing signals from the sensors 120.

Figure 4:
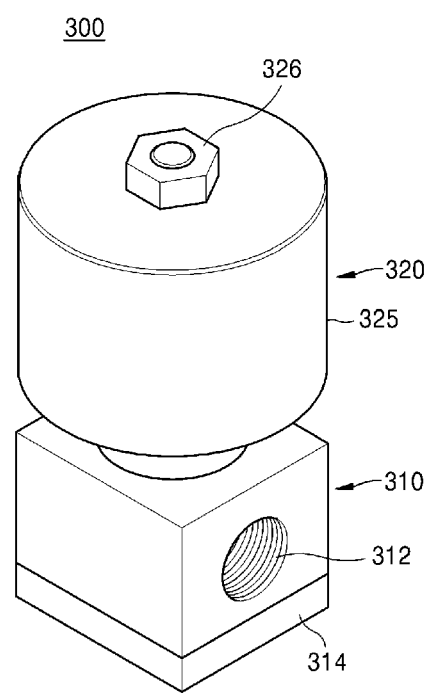
FIG. 4 is a perspective view illustrating a solenoid valve of a steam trap system according to some embodiments of the present invention.
Figure 5:
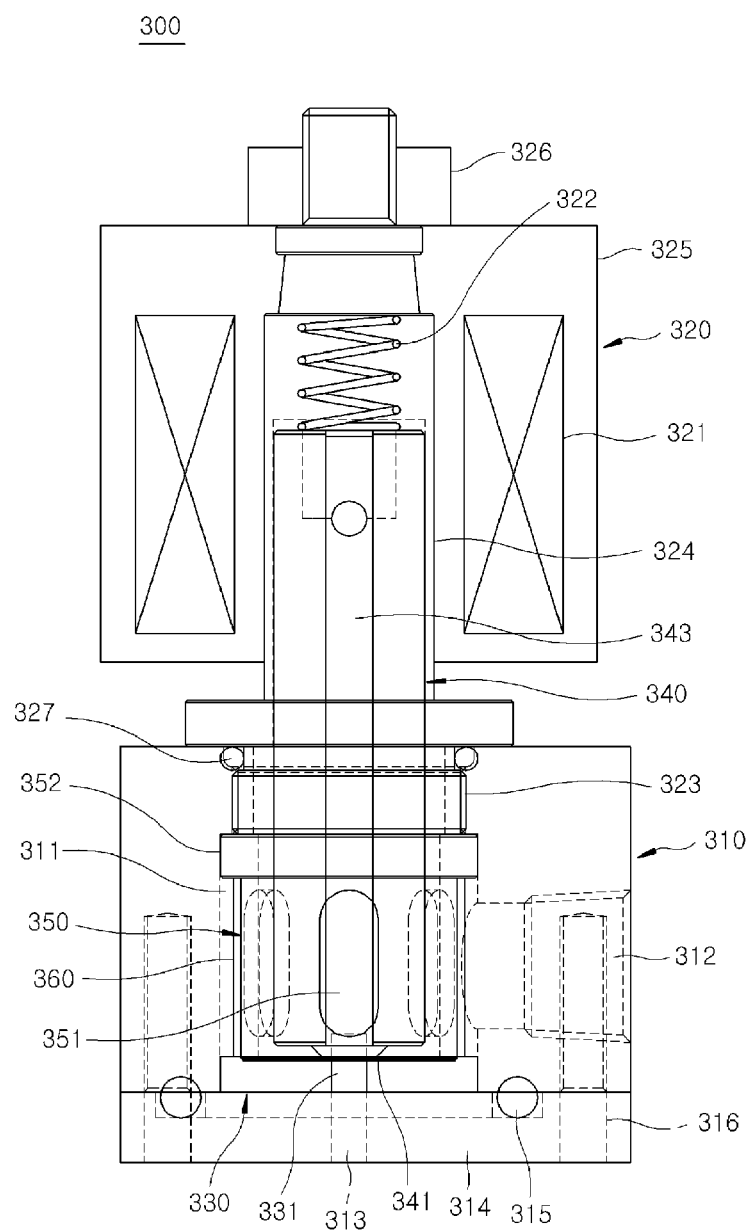
FIG. 5 is a cross-sectional view of FIG. 4.

FIG. 4 is a perspective view illustrating a solenoid valve of a steam trap system according to some embodiments of the present invention. FIG. 5 is a cross-sectional view of FIG. 4.

As illustrated in FIGS. 4 and 5, the solenoid valve 300 of the steam trap system according to some embodiments of the present invention includes a valve body 310, a solenoid driving module 320, a sheet member 330, and a plunger 340.

In the valve body 310, an inflow channel 312 and an outflow channel 313 may be disposed in a lateral part and a bottom part of an operation space 311, respectively. In the valve body 310, a base plate 314 may be detachably fixed by a fastening member 316 such as plural bolts or screws so as to open the bottom thereof, and an O ring 315 may be interposed between the base plate 314 and the valve body 310. Here, the sheet member 330 may be seated on the top surface of the base plate 314.

The solenoid driving module 320 is disposed in the valve body 310, may be coupled to the top of the valve body 310, and may include a solenoid 321 and an elastic member 322. The solenoid driving module 320 may include a cylinder 324 in which a plunger 340 is installed so as to guide movement of the plunger 340. The solenoid 321 may be installed around the cylinder 324 so as to move the plunger 340 in the cylinder 324 by an electromagnetic force. The elastic member 322 applying an elastic force for restoring the plunger 340 downward may be installed on the top of the plunger 340. Here, the elastic member 322 may be made of a compression coil spring, but is not limited thereto and may be made of various spring members such as a tension coil spring depending on the installation positions and the fixation structures thereof. In the cylinder 324, a guide protrusion (not illustrated) may be disposed on the inner side surface so as to be coupled to a guide groove 343 disposed in the length direction in the plunger 340 in a sliding manner.

A screwing portion 323 which is screwed to the top in the operation space 311 may be disposed on the bottom of the solenoid driving module 320, and an O ring 327 may be interposed between the screwing portion 323 and the entrance of the operation space 311. In the solenoid driving module 320, a casing 325 surrounding the solenoid 321 may be fixed to the top of the cylinder 324 with a nut 326.

The sheet member 330 may be installed on the bottom surface of the operation space 311 and may be made of an elastic material, and an outflow hole 331 communicating with the outflow channel 313 may be disposed therein. The sheet member 330 may be in a plate shape which provides an area for seating a mesh socket 350 to be described later and may be made of fluororubber. The sheet member 330 is not limited to this example but may be made of natural rubber or synthetic rubber of various materials having elasticity or may be made of synthetic resin having elasticity.

The plunger 340 may be disposed in the operation space 311 to reciprocate so as to open or close the outflow hole 331 by the solenoid 321 and the elastic member 322, can move downward by the elastic force of the elastic member 322 installed on the top to close the outflow hole 331, may move upward by the electromagnetic force of the solenoid 321 to open the outflow hole 331, and may be provided with a surface contact portion 341 which comes in surface contact with the sheet member 330 to close the outflow hole 331. Here, the surface contact portion 341 may be formed integral with the bottom of the plunger 340 as in this embodiment.

Figure 6:
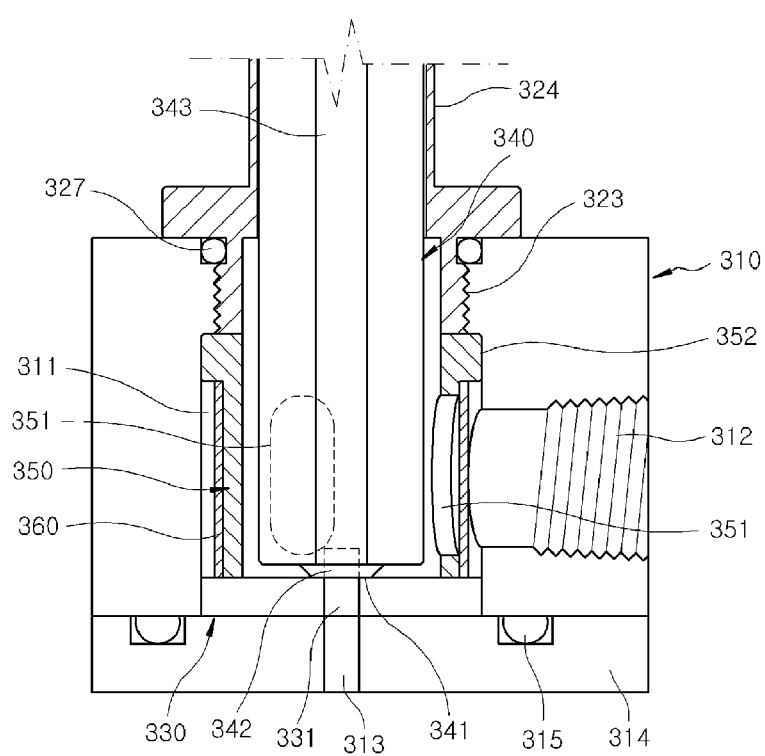
FIG. 6 is a cross-sectional view illustrating a part of FIG. 4.
Figure 7:
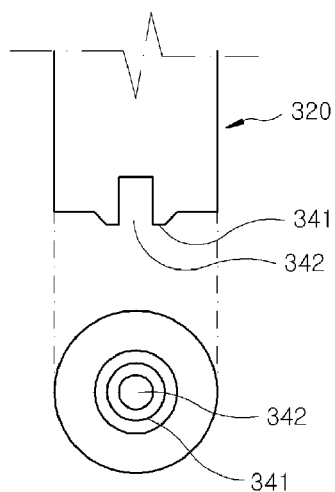
FIG. 7 is a cross-sectional view and a bottom view illustrating a plunger in a solenoid valve of a steam trap system according to some embodiments of the present invention.
Figure 8:
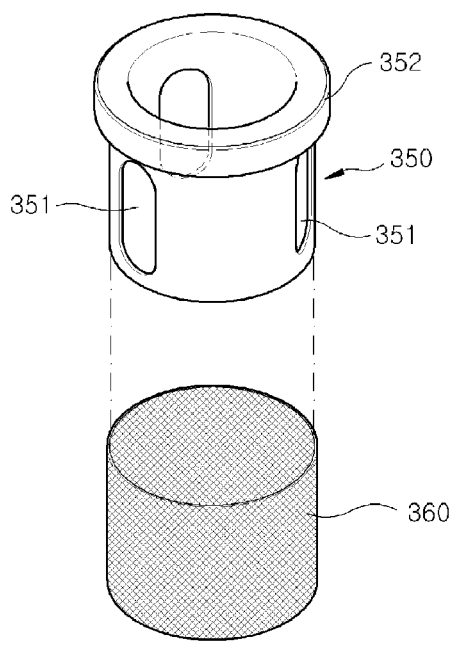
FIG. 8 is a perspective view illustrating a mesh socket and a mesh member in a solenoid valve of a steam trap system according to some embodiments of the present invention.

FIG. 6 is a cross-sectional view illustrating a part of FIG. 4. FIG. 7 is a cross-sectional view and a bottom view illustrating the plunger illustrated in FIG. 6. FIG. 8 is a perspective view illustrating a mesh socket and a mesh member illustrated in FIG. 6.

As illustrated in FIGS. 6 and 7, the surface contact portion 341 is disposed at an end of the plunger 340 in a ring-like protrusion shape to come in surface contact with the surrounding of the outflow hole 331 of the sheet member 330. For this purpose, a groove 342 may be disposed at the center of the surface contact portion 341.

As illustrated in FIGS. 6 and 8, the solenoid valve 300 may be provided with a mesh socket 350 and a mesh member 360.

The mesh socket 350 is located around the plunger 340 so as to be separated from the inner side surface of the operation space 311, and at least one inflow hole 351 may be disposed therein. The mesh socket 350 may include a single inflow hole 351 or may be plural, for example, three inflow holes along the circumference as in this embodiment. A support flange 352 which is pressed down by the screwing portion 323 may be disposed on the top thereof so as to be supported by the screwing portion 323 of the solenoid driving module 320 to be stably fixed to a predetermined position.

The mesh member 360 may have a cylindrical shape, may have a mesh structure for filtering foreign materials from condensate water passing therethrough, and may be attached to the outer side surface of the mesh socket 350.

Figure 9:
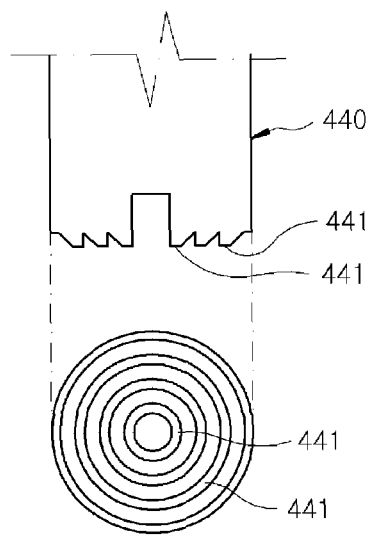
FIG. 9 is a cross-sectional view and a bottom view illustrating another example of the plunger in a solenoid valve of a steam trap system according to some embodiments of the present invention.

FIG. 9 is a cross-sectional view and a bottom view illustrating another example of the plunger in a solenoid valve of a steam trap system according to some embodiments of the present invention.

As illustrated in FIG. 9, a plunger 440 according to another embodiment may include a surface contact portion 441 having a ring-like protrusion shape and may come in surface contact with the circumference of the outflow hole 331 (see FIG. 6) in the sheet member 330 (see FIG. 6). The surface contact portions 441 may be disposed manifoldly at an end thereof to form concentric circles. Accordingly, the surface contact portions 441 form concentric circles and come in close contact with the sheet member 330 (see FIG. 6), whereby it is possible to manifoldly prevent condensate water from leaking between the surface contact portions 441 and the sheet member 330.

Figure 10:
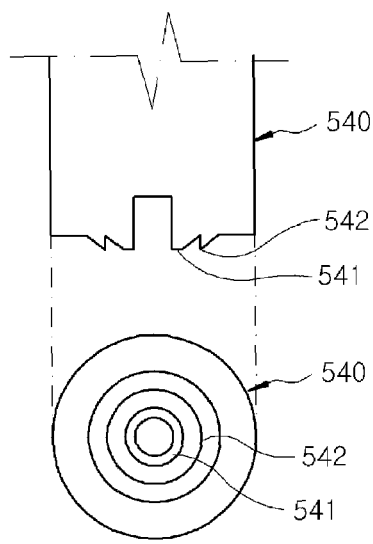
FIG. 10 is a cross-sectional view and a bottom view illustrating still another example of the plunger in a solenoid valve of a steam trap system according to some embodiments of the present invention.

FIG. 10 is a cross-sectional view and a bottom view illustrating still another example of the plunger in a solenoid valve of a steam trap system according to some embodiments of the present invention.

As illustrated in FIG. 10, a plunger 540 according to another embodiment may include a surface contact portion 541 having a ring-like protrusion shape may further include a line contact portion 542, which comes in line contact with the sheet member 330 (see FIG. 6), at an end thereof so as to form concentric circles along with the surface contact portion 541. Accordingly, the line contact portion 542 and the surface contact portion 541 can manifoldly prevent condensate water from leaking between the contact portions and the sheet member 330. Here, the line contact portion 542 is disposed at an end of the plunger 540 so as to protrude in a ring shape and a cross-section thereof may have, for example, an inverted triangle for the purpose of line contact with the sheet member 330 (see FIG. 6) as in this embodiment.

The operation of the above-mentioned steam trap system according to the present invention will be described below.

As illustrated in FIG. 2, when steam is fed through the feeding hole 111, steam is condensed in the first chamber 114 with a temperature fall to generate condensate water. The condensate water collected in the first chamber 114 passes through the penetration hole 116a by the feed pressure of steam and is discharged to the outside through the second chamber 115 and the discharging hole 112. At this time, the control unit 150 receiving sensing signals of the sensors 120 for measuring a water level may control the solenoid valve 300 so as to maintain the water level of the condensate water in the first chamber 114 within a predetermined range of water level, thereby turning on/off the flow of condensate water discharged by the solenoid valve 300.

The sensor 120 may be installed in the housing 110 for the purpose of measurement of the water level of condensate water, the flow rate, or the like, the terminal 121 needs to be exposed or protrude from the housing 110 for the purpose of output the sensing signals to the outside, and it thus may be difficult to maintain the air-tightness of the housing 110. However, according to the embodiments of the present invention, it is possible to maintain the insulation of the sensor 120 by the use of the insulation member 130 and to improve assembly efficiency of the sensor 120 and the air-tightness of the housing 110.

It is also possible to minimize a back flow of steam or condensate water through the feeding hole 111 using the condensation guide pins 260 illustrated in FIG. 3 and it is also possible to guide dropped condensate water so as to minimize contact with a measuring site of the bottom of the sensor 220 using the condensate water guide 224 disposed in the sensor 220.

The solenoid valve 300 illustrated in FIGS. 5 and 6 can prevent the flow channel from serving as resistance to the flow of condensate water so as not to gather the condensate water therein at the time of discharging the condensate water, whereby it is possible to smoothly discharge the condensate water. When the flow of condensate water is turned off, it is possible to prevent condensate water from leaking by the surface contact of the plunger 340 with the sheet member 330 having elasticity. It is also possible to filter foreign materials included in the condensate water using the mesh member 360, to improve assembly efficiency of the mesh member 360 using the mesh socket 350, and to stably install the mesh member 360.

Since the surface contact portions 441 are disposed manifoldly in the plunger 440 so as to form concentric circles as illustrated in FIG. 9 or the surface contact portion 541 and the line contact portion 542 are disposed manifoldly in the plunger 540 as illustrated in FIG. 10, it is possible to prevent condensate water from leaking between the plunger and the sheet member.

While the present invention has been described with reference to the embodiments illustrated in the drawings, the embodiments are merely illustrative, and it will be understood by those skilled in the art that the present invention can be modified in various forms. Therefore, the technical scope of the present invention will be determined based on the technical spirit of the appended claims.

What is claimed is:

1. A steam trap system comprising:
   a housing that includes a feeding hole for feeding steam, a discharging hole for discharging condensate water, and an opening;
   at least one sensor that is installed inside the housing via the opening;
   an insulation member that is disposed in the opening to maintain air-tightness and to which the sensor is fixed to expose a terminal; and
   a cover that is installed in the insulation member to cover the terminal,
   wherein the insulation member includes an attachment portion that is disposed inside of the opening via a sealing member and an edge of the attachment portion is fixed to the circumference of the opening with a fastening member, and
   wherein a terminal block is disposed between the cover and the terminal, the cover is fixed onto the insulation member, and a drawing hole through which a cable connected to the terminal is drawn is disposed in the cover.

2. The steam trap system according to claim 1, wherein the sensor includes:
   an electrode that is disposed to extend downward from the insulation member;
   an insulation pipe that is disposed outside the electrode; and
   a condensate water guide that is disposed at the bottom of the insulation pipe so as to expand in a radial direction downward.

3. The steam trap system according to claim 1, wherein the housing includes:
   first and second chambers in which the feeding hole and the discharging hole are disposed, respectively, and that are partitioned by a partition wall;
   a penetration hole that is disposed at the bottom the partition wall; and
   a cap that is detachably attached to an outlet in a lower part.

4. The steam trap system according to claim 3, further comprising a plurality of condensation guide pins that are disposed at vertical intervals on a surface of the partition wall facing the feeding hole so as to guide condensation of steam.

5. The steam trap system according to claim 4, wherein the condensation guide pins are inclined upward from the partition wall and a passing hole for passing condensate water is disposed at the bottom thereof.

6. A steam trap system comprising:
   a housing that includes a feeding hole for feeding steam, a discharging hole for discharging condensate water, and an opening;
   at least one sensor that is installed inside the housing via the opening;
   an insulation member that is disposed in the opening to maintain air-tightness and to which the sensor is fixed to expose a terminal;
   a cover that is installed in the insulation member to cover the terminal; and
   a solenoid valve that is installed on the discharging hole side of the housing so as to turn on/off discharging of condensate water,
   wherein the solenoid valve includes:
   a valve body in which an inflow channel and an outflow channel are disposed in a lateral part and a bottom part of an operation space;

a solenoid driving module that is disposed in the valve body and includes a solenoid and an elastic member;

a sheet member that is disposed on the bottom surface of the operation space, is made of an elastic material, and includes an outflow hole communicating with the outflow channel; and a plunger that is disposed in the operation space so as to reciprocate to open or close the outflow hole by the solenoid and the elastic member and that is provided with a surface contact portion coming in surface contact with the sheet member.

7. The steam trap system according to claim 6, further comprising:

a mesh socket that is disposed around the plunger to be separated from the inner side surface of the operation space and includes at least one inflow hole; and a mesh member that is disposed at the outer side surface of the mesh socket.

8. The steam trap system according to claim 7, wherein the solenoid driving module includes a screwing portion that screws the solenoid driving module into the operation space, and wherein the mesh socket includes a support flange that is supported by the screwing portion.

9. The steam trap system according to claim 7, wherein the sheet member has a plate shape on which the mesh socket is seated and is made of fluororubber.

10. The steam trap system according to claim 6, wherein the surface contact portion is in a ring-like protrusion shape and disposed at an end of the plunger.

11. The steam trap system according to claim 10, wherein the surface contact portion is disposed manifoldly at an end of the plunger to form concentric circles.

12. The steam trap system according to claim 10, wherein a line contact portion coming in line contact with the sheet member is disposed at an end of the plunger to form concentric circles with the surface contact portion.

* * * * *